(12) United States Patent
Qu et al.

(10) Patent No.: US 8,144,625 B2
(45) Date of Patent: Mar. 27, 2012

(54) DISPLAYPORT AUXILIARY CHANNEL ACTIVE BUFFER WITH AUXILIARY CHANNEL/DISPLAY DATA CHANNEL COMBINER FOR FAST AUXILIARY CHANNEL

(75) Inventors: Ming Qu, San Jose, CA (US); Zhengyu Yuan, Cupertino, CA (US); Kochung Lee, San Jose, CA (US)

(73) Assignee: Parade Technologies, Ltd., Grand Cayman (KY)

( * ) Notice: Subject to any disclaimer, the term of this patent is extended or adjusted under 35 U.S.C. 154(b) by 280 days.

(21) Appl. No.: 12/643,759

(22) Filed: Dec. 21, 2009

(65) Prior Publication Data
US 2011/0149796 A1 Jun. 23, 2011

(51) Int. Cl.
*H04L 12/28* (2006.01)
*H04L 1/00* (2006.01)
*H04L 12/26* (2006.01)
*H03K 5/01* (2006.01)
*G06F 13/00* (2006.01)

(52) U.S. Cl. ......... 370/254; 710/107; 327/100; 370/252

(58) Field of Classification Search .................. 370/252, 370/254; 710/107; 327/565
See application file for complete search history.

(56) References Cited

U.S. PATENT DOCUMENTS
7,706,692 B2 * 4/2010 Tatum et al. ............... 398/139
2007/0292135 A1 * 12/2007 Guo et al. .................. 398/106
* cited by examiner

*Primary Examiner* — Ronald Abelson
(74) *Attorney, Agent, or Firm* — Fenwick & West LLP

(57) ABSTRACT

A system and a method for exchanging communication data between devices using a bi-directional communication channel are disclosed. A combiner is coupled to a source device via first bi-directional configuration channel and to a sink device via a second bi-directional configuration channel. Upon receiving data from the first bi-directional configuration channel and not receiving data from the second bi-directional configuration channel, the combiner transmits the received data to the sink device using the second bi-directional configuration channel and prevents data transmission from the sink device to the source device using the second bi-directional configuration channel. Similarly, upon receiving data from the second bi-directional configuration channel and not receiving from the first bi-directional configuration channel, the combiner prevents data transmission from the source device to the sink device and transmits the received data to the source device using the first bi-directional configuration channel.

24 Claims, 3 Drawing Sheets

DISPLAYPORT AUXILIARY CHANNEL ACTIVE BUFFER WITH AUXILIARY CHANNEL/DISPLAY DATA CHANNEL COMBINER FOR FAST AUXILIARY CHANNEL

BACKGROUND

1. Field of Art

The present invention generally relates to the field of integrated semiconductor circuits, and more specifically, to exchanging configuration data between devices using a bi-directional communication channel.

2. Description of the Related Art

DisplayPort is an industrial standard of digital interface between two or more devices. Commonly, a DisplayPort interface controls transfer of video and/or audio from a source device, such as a graphics processing unit (GPU) or graphics adapter, to a sink device, such as computer display or other display device. DisplayPort uses two channels, a Main Link and an Auxiliary Channel (AUX-CH) to communicate data between the source device and the sink device. The Main Link serially transmits video, audio and other secondary data at a first rate while the AUX-CH carries management and device control data for establishment or configuration of the Main Link at second rate which is slower than the first rate. Generally, the source device initiates transmission of data through the AUX-CH, allowing the source device to modify Main Link characteristics, although the sink device may prompt modification of the Main Link by sending an interrupt request (IRQ) to the source device via the AUX-CH.

However, other digital interfaces may also be used for interfacing a source device and a sink device. For example, a High Definition Multimedia Interface (HDMI) or a Digital Visual Interface (DVI), may be used to exchange information between the source device and the sink device. Hence, devices used for interfacing the source device and the sink device generally support communication of different types of management and device control data, such as the DisplayPort Interface, HDMI, DVI or other digital interfaces. For example, Display Data Channel (DDC) protocols are commonly used for communicating supported display modes from a display to a GPU or for communicating adjustments to display parameters, such as brightness or contrast, from a GPU or graphics adapter to a display device. To support a variety of devices which may use different protocols, it is beneficial for an interface between different devices to support data exchange using different protocols. However, conventional approaches to supporting different protocols typically use individual connections associated with each protocol for data transmission, increasing the size and complexity of a device.

SUMMARY

Embodiments of a system and a method for using a bi-directional communication channel to exchange configuration data between devices are disclosed. In an embodiment, a combiner is coupled to a source device via first bi-directional configuration channel and is also coupled to a sink device via a second bi-directional configuration channel. To simplify communication of data between the source device and the sink device, the combiner regulates data transmission using the first bi-directional configuration channel and the second bi-directional configuration channel. In an embodiment, responsive receiving data transmitted from the source device via the first-bi-directional configuration channel, the combiner transmits the received data from the source device to the sink device using the second bi-directional configuration channel while preventing data transmission from the sink device to the source device using the second bi-directional configuration channel. Hence, the combiner establishes a uni-directional communication channel from the source device to the sink device using the first bi-directional configuration channel and the second bi-directional configuration channel upon receiving data from the source device. Similarly, if the combiner identifies data transmission from the sink device to the source device within the second bi-directional configuration channel, the combiner prevents data transmission from the source device to the sink device while transmitting the identified data to the source device using the first bi-directional configuration channel. In an embodiment, the combiner also receives data from the source device via a Display Data Channel (DDC) and communicates data from the DDC to the sink device using the second bi-directional configuration channel.

In an embodiment, the combiner includes a first receiver and a first squelch module which are coupled to a first bi-directional configuration channel as well as a second receiver and a second squelch module which are coupled to a second bi-directional configuration channel. A first transmitter is coupled to the second bi-directional configuration channel and to the first squelch module while a second transmitter is coupled to the first bi-directional configuration channel and to the second squelch module. If the first squelch module receives data from the first bi-directional configuration channel, the first squelch module enables the first transmitter to transmit data from the first receiver to the second bi-directional communication device. Also, the first squelch module transmits a disable signal to the second squelch module which transmits the disable signal to the second transmitter, preventing the second transmitter from transmitting data to the first bi-directional configuration channel.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

Figure 1:
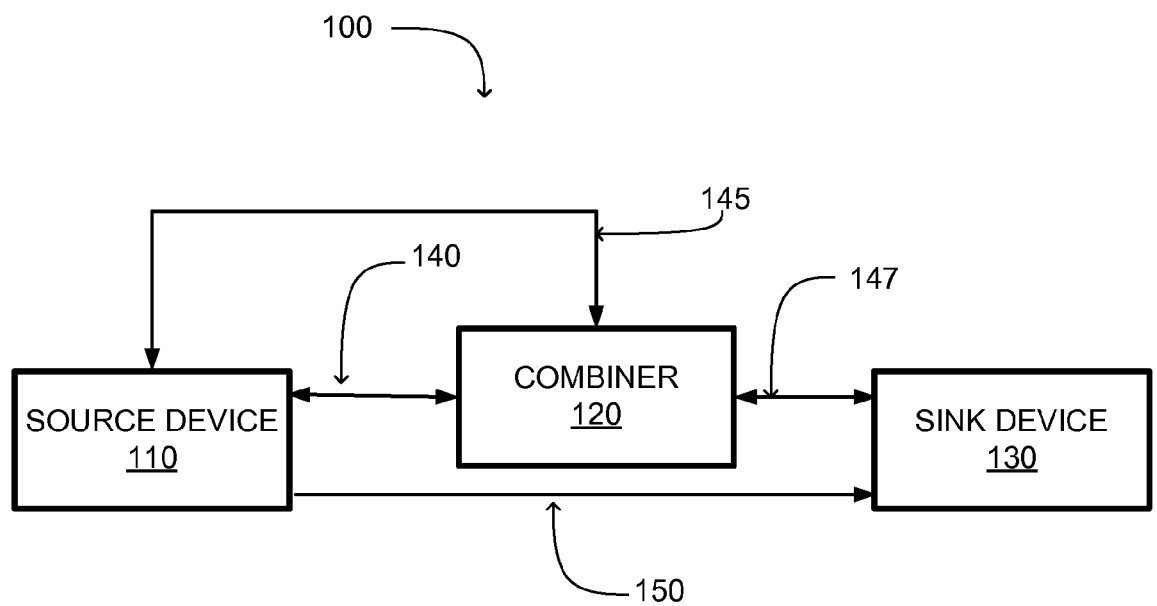
FIG. 1 is a block diagram of a system for transmitting configuration data using a bi-directional channel according to one embodiment of the invention.

A system and method for exchanging configuration data between devices using a bi-directional communication channel are described. For purposes of explanation, numerous specific details are set forth in order to provide a thorough understanding of the invention. It will be apparent, however, to one skilled in the art that the invention can be practiced without these specific details. In other instances, structures and devices are shown in block diagram form to avoid obscuring the invention.

Reference will now be made in detail to several embodiments, examples of which are illustrated in the accompanying Figures. It is noted that wherever practicable similar or like reference numbers may be used in the figures and may indicate similar or like functionality. The Figures depict embodiments of the present invention for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

System Architecture

FIG. 1 illustrates one embodiment of a system 100 for communicating data between a source device 110 and a sink device 130. The system 100 includes two data a Display Data Channel (DDC) 140, a first configuration channel 145, a second configuration channel 147 and a Main Link 150. A combiner 120 receives data from the source device 110 via the first configuration channel 145 or the DDC 140 and the combiner 120 communicates output data to the sink device 130 using the second configuration channel 147. In an embodiment, the first configuration channel 145 and the secondary configuration channel 147 communicate data having a different format than the DDC 140. For example, the first configuration channel 145 communicates data using a DisplayPort protocol, such as an Auxiliary Channel (AUX-CH) format, while the DDC 140 communicates data using one or more conventional protocols associated with a Display Data Channel.

The source device 110 is any device which transmits video and/or audio data, such as a graphics processing unit (GPU) or a graphics adapter. In one embodiment, the source device 110 initiates communication with a sink device 130 and also modifies characteristics of the Main Link 150 by transmitting data to the sink device 130 using the DDC 140 or the first secondary configuration channel 145.

The sink device 130 is any device which receives video and/or audio data, such as a computer display or other display device which receives and processes video and/or audio data. In an embodiment, the sink device 130 acts as the slave device and is modified based on data received from the source device 110. However, the sink device 130 may also initiate configuration or modification of the Main Link 150. In an embodiment, the sink device 130 prompts initiation Main Link 150 configuration by sending an interrupt request (IRQ) to the source device 110 via the first configuration channel 145 an the secondary configuration channel 147.

The Display Data Channel (DDC) 140 transmits configuration data for the sink device 130 using Display Data Channel (DDC) protocols. For example, if implementing a DDC protocol, the DDC 140 comprises two signal paths, a Serial Data Line (SDL) and a Data Clock Line (DCL). The DDC 140 is used for an the initial "handshake" establishing the Main Link 150 between source device 110 and sink device 130, for checking the validity and status of the Main Link 150 and for modifying to modify the Main Link 150

The configuration channels 145, 147 are bi-directional communication links which transmits data for establishing or configuring the Main Link 150 between the source device 110 and the sink device 130 or transmits data for controlling the source device 110 or sink device 130. In an embodiment, the configuration channels 145, 147 communicate data using an AUX-CH format associated with a DisplayPort interface. For example, if implementing an AUX-CH format, the configuration channels 145, 147 each comprise Alternating Current (AC) coupled, doubly terminated differential pairs. Additionally, the configuration channels 145, 147 are used for the initial "handshake" establishing the Main Link 150 between source device 110, or another device, and sink device 130. Further, the source device 110 uses the configuration channels 145, 147 to check the validity and status of the Main Link 150 and also uses the configuration channels 145, 147 to modify the Main Link 150. Hence, the configuration channels 145, 147 are used to establish and maintain the Main Link 150 connection between source device 110 and sink device 130.

Because the combiner 120 is coupled to the DDC 140 and the configuration channels 145, 147, various types of source devices 110 may exchange data with the sink device 130. The DDC 140 enables source devices using DDC-compatible protocols to configure the sink device 130. Additionally, the configuration channels 145, 147 allow other types of source devices 110, or additional devices, to configure the sink device 130 using different protocols, such as the DisplayPort interface AUX-CH.

While the DDC 140 or configuration channels 145, 147 communicate configuration and/or control data, the Main Link 150 transmits video and/or audio data from the source device 110 to the sink device 130. The Main Link 150 is a uni-directional communication channel transmitting video and/or audio data from source device 110 to sink device 130. For example, the Main Link 150 comprises one or more AC-coupled, doubly-terminated differential pairs, commonly referred to as "lanes." In an embodiment, the Main Link 150 supports multiple data rates, such as, 2.7 Gigabits per second (Gbps) and 1.62 Gbps. Hence, the Main Link 150 allows high-speed transmission of video and/or audio data from source device 110 to sink device 130 without including link or device configuration or maintenance data.

Figure 2:
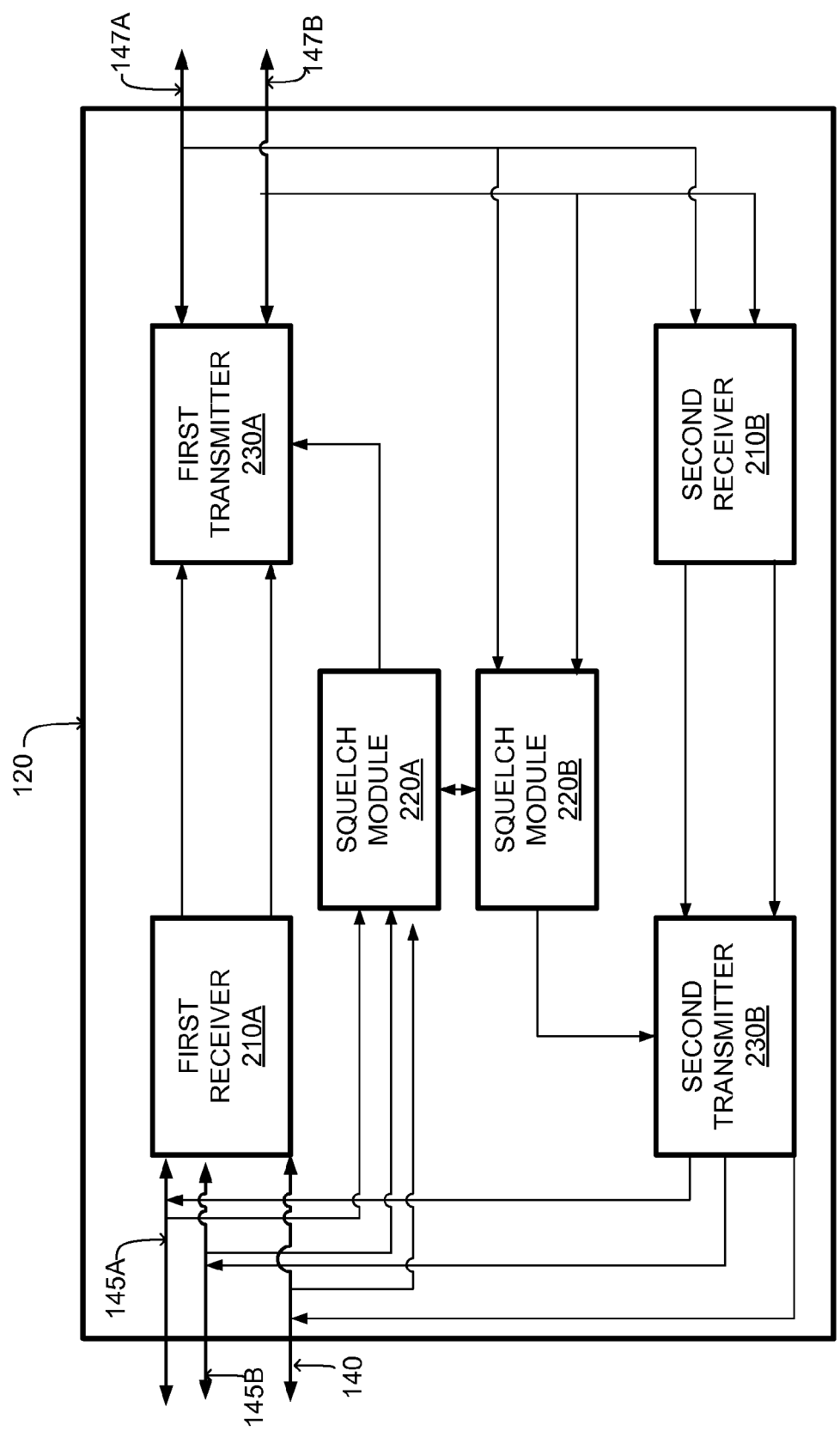
FIG. 2 is a block diagram of a combiner for communicating configuration data between a source device and a sink device using a bi-directional channel according to one embodiment of the invention.

FIG. 2 shows a block diagram of one embodiment of a combiner 120 for communicating data using the configuration channels 145, 147, which comprise bi-directional communication channels, such as bi-directional buses. The Bi-directionality of the configuration channels 145, 147 and the DDC 140 allows the source device 110, or another device, to communicate configuration data to the sink device 130 while also allowing the sink device 130 to initiate configuration by communicating with the source device 110, or other device.

In the embodiment shown by FIG. 2, the combiner 120 includes a first receiver 210A coupled to a first configuration channel 145 and to the DDC 140 and a second receiver 210B coupled to a second configuration channel 147. Additionally, the combiner 120 includes a first transmitter 230A coupled to the first configuration channel 145 and coupled to the second configuration channel 147. A second transmitter 230B is coupled to the second receiver 210B and coupled to the first communication channel 145 and to the DDC 140. In the embodiment depicted by FIG. 2 the first configuration channel 145 comprises two subchannels 145A, 145B and the second configuration channel 147 comprises two subchannels 147A, 147B.

For example, the first configuration channel 145 communicates data using a DisplayPort AUX-CH interface, so the first subchannel 140A communicates a positive AUX-CH signal (an "AUXp" signal) and the second subchannel 140B communicates a negative AUX-CH signal (an "AUXn" signal). Similarly, if the second configuration channel 147 also transmits AUX-CH formatted data with the subchannels 147A, 147B of the second configuration channel communicating an AUXp signal and an AUXn signal. However, in other embodiments, the configuration channels 145, 147 include a greater or less number of subchannels. The DDC 140 transmits configuration data for the sink device 130 using Display Data Channel (DDC) protocols. For example, if implementing a DDC protocol, the DDC 140 comprises two signal paths, a Serial Data Line (SDL) and a Data Clock Line (DCL).

A first squelch module 220A is coupled to the first configuration channel 145 and to the DDC 140, so that the first squelch module 220A and the first receiver 210A receive data from the first configuration channel 145, or the DDC 140, in parallel. The first squelch module 220A is also coupled to the first transmitter 230A. Similarly, a second squelch module 220B is coupled to the second configuration channel 147, so that the second squelch module 220B and the second receiver 210B receive data from the second configuration channel 147 in parallel. The second squelch module is also coupled to the second transmitter 230B. The first squelch module 220A and second squelch module 220B are also coupled to each other to allow data exchange between the squelch modules 220A, 220B. To manage data communication through the first configuration channel 145, or the DDC 140, and the second configuration channel 147, the first squelch module 220A and the second squelch module 220B generate control signals regulating data transmission along the second configuration channel 147 or the first configuration channel 145 and/or the DDC 140, respectively.

When a squelch module 220 receives data from the DDC 140 or from the configuration channel 145, 147 coupled to the squelch module 220, the squelch module 220 modifies the combiner 120 so that the first configuration channel 145, or the DDC 140, and the second configuration channel 147 operate as a uni-directional communication channel communicating data from the DDC 140 or from configuration channel 145, 147 including the received data. For example, when the first squelch module 220A detects data from the first configuration channel 145, or from the DDC 140, the first squelch module 220A communicates a disable control signal to the second squelch module 220B which is transmitted to the second transmitter 230B, preventing the second transmitter 230B from transmitting data from the second configuration channel 147 to the first communication channel 145 or to the DDC 140. After generating the disable control signal, the first squelch module 220A generates an enable control signal that is transmitted to the first transmitter 230B, enabling communication of the detected data is communicated from the first receiver 210 to the first transmitter 230A, which subsequently communicates the data to the sink device 130 using the second configuration channel 147. In an embodiment, upon receiving data from the first configuration channel 145 or from the DDC 140, the first squelch module 220A communicates with the second squelch module 220B to determine that the second squelch module 220B has not previously received data from the second configuration channel 147. This determines whether the second configuration channel 147 is transmitting data before generating the disable control signal. Thus, when the first squelch module 220A detects a signal on the first communication channel 145 or on the DDC 140, the combiner 120 permits uni-directional communication from the first communication channel 145, or from the DDC 140, to the second communication channel 147, allowing communication of data to the sink device 130, while preventing transmission of data from the sink device 130 via the second communication channel 147.

Similarly, if the second squelch module 220B receives data from the second configuration channel 147, the second squelch module 220B communicates a disable control signal to the first squelch module 220A and enables the second transmitter 230B. In an embodiment, the second squelch module 220B communicates with the first squelch module 220A to determine that the first squelch module 220A has not previously received data from the first configuration channel 147 prior to generating the disable control signal. The first squelch module 220A communicates the disable control signal to the first transmitter 230A, preventing the first transmitter 230A from communicating data from the first configuration channel 145 or from the DDC 140 to the second configuration channel 147. Hence, when the second squelch module 220B receives data from the second configuration channel 147 and the first squelch module 220A, the combiner 120 transmits data from the second configuration channel 147 to the first configuration channel 145 or to the DDC 140 via the second receiver 210B and the second transmitter 230B while preventing data transmission from the first configuration channel 147.

In an embodiment, the first squelch module 220A and the second squelch module 220B comprise a buffer coupled to a signal presence detector. For example, responsive to the signal presence detector in the first squelch module 220A detecting data from the first configuration channel 145 or from the DDC 140, the buffer in the first squelch module 220A stores the detected data while the first squelch module 220A communicates a disable control signal to the second squelch module 220B. In an embodiment, the disable control signal also includes a query determining whether the second squelch module 220B has previously detected data from the second configuration channel 147. If the second squelch module 220B has not previously detected data from the second configuration channel 147, the second squelch module 220B communicates the disable control signal to the second transmitter 220B, deactivating the second transmitter 230B.

The first squelch module 220A also communicates an enable control signal to the first transmitter 230A, so that data from the first receiver 210A or from the first squelch module 220A communicated to the first transmitter 230A is communicated from the first transmitter 230A to the second configuration channel 147. After enabling the first transmitter 230A, the first squelch module 220A transmits data stored in the buffer of the first squelch module 220A to the first transmitter 230A for communication to the second configuration channel 147. Hence, the disable control signal and the enable control signal generated by the first squelch module 220A result in uni-directional communication of data through the combiner from the first configuration channel 145, or from the DDC 140, to the second configuration channel 147. Similar actions are performed by the second squelch module 220B when a signal presence detector in the second squelch module 220B detects a data from the second configuration channel 147. Hence, the second squelch module 220B communicates a disable signal to the first squelch module 220A to deactivate the first transmitter 230A and communicates an enable control signal to the second transmitter 230B so that data is communicated from the second configuration channel 147 to the first configuration channel 145, or to the DDC 140, using the second receiver 210B and the second transmitter 230B while data is not communicated from the first configuration channel 145, or from the DDC 140, to the second configuration channel 147.

When the first squelch module 220A no longer detects data from the first configuration channel 145, or from the DDC 140, the first squelch module 220A communicates a disable control signal to the first transmitter 230A which terminates the connection between the first configuration channel 145, or the DDC 140, and the second configuration channel 147. Similarly, when the second squelch module 220B ceases to detect a signal from the second configuration channel 147, the second squelch module 220B communicates a disable signal to the second transmitter 230B to halt the connection between the second configuration channel and the first configuration channel 145, or the DDC 140. In one embodiment, the squelch modules 220 compare received data to a threshold value, and responsive to received data equaling or exceeding the threshold value, a squelch module determines that data is received from the DDC 140 or from a configuration channel 145, 147 coupled to the squelch module 220. Similarly, if data received by a squelch module 220 is less than the threshold value, the squelch module 220 determines that data is not received from the DDC 140 or from a configuration channel 145, 147 coupled to the squelch module 220.

Hence, the combiner 120 establishes uni-directional communication from the sink device 130 to the source device 110 by coupling the second configuration channel 147 to the first configuration channel 145, or to the DDC 140, and blocking communication from the first configuration channel 145, or from the DDC 140, to the second configuration channel 147. Alternatively, the combiner 120 enables uni-directional communication from the source device 110 to the sink device 130 by coupling the first configuration channel 145, or the DDC 140, to the second configuration channel 147 and blocking communication from the second configuration channel 147 to the first configuration channel 145, or to the DDC 140. The first squelch module 220A and the second squelch module 220B enable the combiner 120 to dynamically manage communication using the first configuration channel 145, or using the DDC 140, and the second configuration channel 147 by prioritizing communication based on the communication channel initiating the communication.

By allowing communication of data from a DDC 140 or a first communication channel 145 to a sink device, the combiner 120 simplifies dual-mode transmission by the source device 130. For example, the combiner 120 simplifies source device 130 transmission of data using a DDC protocol as well as using the DisplayPort AUX-CH protocol by receiving data in different protocols and communicating the data to a sink device 130.

In one embodiment, the combiner 120 is included in an integrated device, reducing costs and simplifying system design. For example, including the combiner 120 in an integrated device, such as an integrated circuit chip, increases the amount of area available on a target platform, such as a Printed Circuit Board (PCB), for additional components. Additionally, including the combiner 120 in an integrated device allows the integrated device to include additional components to improve data transmission between the source device 110 and the sink device 130 in a reduced area. For example, one or more components, such as T-sections or other filters, are included in the integrated component and connected to the combiner 120, improving the quality of the output of the combiner 120 while also conserving area on the platform to which the integrated device is mounted, such as a PCB. Additionally, in an embodiment, an integrated device including the combiner is powered by a single power supply, such as a 3.3 volt power supply, rather than using different power supplies to power individual elements.

System Operation

Figure 3:
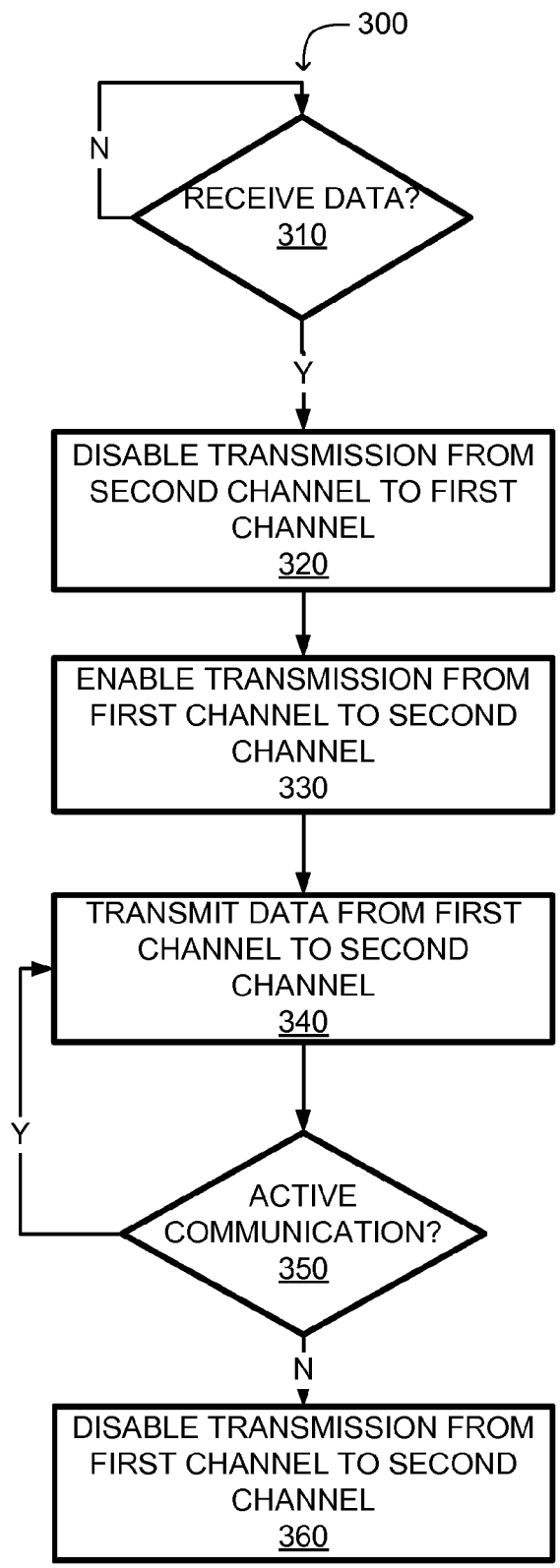
FIG. 3 is a flow chart of a method for communicating configuration data between a source device and a sink device using a bi-directional channel according to one embodiment of the invention.

FIG. 3 is a flow chart of a method 300 for communicating configuration data between a source device 110 and a sink device 130 using a bi-directional channel according to one embodiment of the invention. In an embodiment, the steps depicted in the method shown in FIG. 3 are implemented by instructions for performing the described actions embodied or stored within a computer readable medium, such as a memory, which are executable by a processor. Those of skill in the art will recognize that the method may be implemented in embodiments of hardware and/or software or combinations thereof. Moreover, other embodiments can include different and/or additional steps than the ones shown in FIG. 3. For purposes of illustration, the method 400 monitors the first configuration channel 145 or DDC 140 for data and communicates data from the first configuration channel 145 or DDC 140 to the second configuration channel 147; however, a similar method is used to monitor the second configuration channel 147 and to communicate data from the second configuration channel 147 to the first configuration channel 145 or DDC 140.

Initially, first squelch module 220A determines 310 whether data such as configuration commands or parameters, is received from the first configuration channel 145 or DDC 140. In an embodiment, the first squelch module 220A compares data from the first configuration channel 145, or from the DDC 140, to a threshold value, and determines 310 that data is being received when the data from the first configuration channel 145, or from the DDC 140, equals or exceeds the threshold value. For example, a voltage level from the first configuration channel 145, or from the DDC 140, is compared to a threshold voltage to determine 310 receipt of data from the first configuration channel 145, or from the DDC 140. In an embodiment, the first squelch module 220A communicates with the second squelch module 220B to determine whether the second squelch module 220B has previously detected data transmitted using the second configuration channel 147. If the first squelch module 220A determines 310 that data is not received from the first configuration channel 145, the first squelch module 220A continues to monitor the first configuration channel to determine 310 receipt of data from the first communication channel 145, or from the DDC 140.

Responsive to determining 310 that data is received from the first configuration channel 145, or from the DDC 140, the first squelch module 220A generates a disable control signal that is transmitted to the second squelch module 220B, which in turn communicates the disable control signal to the second transmitter 230B to disable 320 the second transmitter 230B. After disabling 320 the second transmitter, the first squelch module 220A generates an enable control signal that is transmitted to the first transmitter 230A, enabling 330 transmission of data from the first configuration channel 145 to the second configuration channel 147 using the first transmitter 230A. Hence, the enable control signal enables 330 communication of data from the first communication channel 145, or from the DDC 140, to the second communication channel 147 using the first transmitter 230A while the disable control signal disables 420 communication of data from the second communication channel 147 to the first communication channel 145, or to the DDC 140, via the second transmitter 230B.

After disabling 320 the first transmitter 230A and enabling 330 the second transmitter 230B, data from the first configuration channel 145, or from the DDC 140, is received by the first receiver 210A and communicated to the first transmitter 230A, which transmits 340 the data to the second communication channel 147. Hence, the first squelch module 220A and the second squelch module 220B modify the first transmitter 230A and the second transmitter 230B to implement unidirectional communication from the first configuration channel 145, or from the DDC 140, to the second configuration channel 147.

While data is transmitted 240 from the first configuration channel 145, or from the DDC 140, to the second configuration channel 147, the first squelch module 220A determines 350 whether data is received from the first configuration channel 145, indicating that data is actively being transmitted. In an embodiment, the first squelch module 220A compares data from the first configuration channel 145, or from the DDC 140, to a threshold value and determines 350 that the first configuration channel 145, or the DDC 140, is actively transmitting data when data from the first configuration channel 145, or from the DDC 140, equals or exceeds the threshold value. If the first configuration channel 145, or from the DDC 140, is actively used for data communication, data from the first configuration channel 145, or from the DDC 140, is transmitted 340 to the second configuration channel 147 via the first receiver 210A and the first transmitter 230A. If the first squelch module 220A determines 350 that the first configuration channel 145, or that the DDC 140, is inactive, the first squelch module 220A generates a disable control signal that is communicated to the first transmitter 230A to disable 360 transmission of data from the first configuration channel 145 to the second configuration channel 147.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for communicating configuration data between devices, the system comprising:
    a main communication channel coupled to a source device, the main communication channel communicating data from the source device to the sink device;
    a first bi-directional configuration channel coupled to the source device and to a combiner, the first bi-directional configuration channel transmitting configuration data having a first format;
    a second bi-directional configuration channel coupled to the sink device and to the combiner;
    a Display Data Channel coupled to the source device and to the combiner, the Display Data Channel transmitting configuration data having a second format;
    the combiner for receiving configuration data from the source device via the first bi-directional configuration channel or via the Display Data Channel and transmitting the configuration data received from the first bi-directional configuration channel or from the Display Data Channel to the sink device via the second bi-directional configuration channel while preventing data transmission from the sink device via the second bi-directional configuration channel.

2. The system of claim 1, wherein the combiner includes a signal presence detector for determining receipt of configuration data from the source device via the first bi-directional configuration channel by determining whether a value associated with data from the first bi-directional configuration channel equals or exceeds a threshold value.

3. The system of claim 2, wherein the value associated with data from the first bi-directional configuration channel comprises a voltage and the threshold value comprises a threshold voltage.

4. The system of claim 1, wherein the combiner further prevents data transmission from source device to the sink device via the first bi-directional configuration channel and via the Display Data Channel and transmits configuration data from the sink device using the second bi-directional configuration channel to the first bi-directional configuration channel responsive to receiving configuration data from the sink device via the second bi-directional configuration channel and failing to receive configuration data from the source device via the first bi-directional configuration channel.

5. The system of claim 1, wherein the combiner prevents data transmission from the source device to the sink device via the first bi-directional configuration channel responsive to failing to receive configuration data from the source device via the first bi-directional configuration channel.

6. The system of claim 5, wherein failing to receive configuration data from the source device via the first bi-directional configuration channel comprises determining a value associated with data from the first bi-directional configuration channel is less than a threshold value.

7. The system of claim 6, wherein the value associated with data from the first bi-directional configuration channel comprises a voltage and the threshold value comprises a threshold voltage.

8. The system of claim 1, further comprising:
a filter coupled to the combiner and to the second bi-directional configuration channel, the filter for receiving the configuration data from the combiner, filtering the configuration data to generate filtered configuration data and transmitting the filtered configuration data to the sink device via the second bi-directional configuration channel.

9. The system of claim 8, wherein the filter comprises a T-section filter.

10. The system of claim 1, wherein the combiner includes a signal presence detector for determining receipt of configuration data from the source device via the Display Data Channel by determining whether a value associated with data from the Display Data Channel equals or exceeds a threshold value.

11. The system of claim 10, wherein the value associated with data from the Display Data Channel comprises a voltage and the threshold value comprises a threshold voltage.

12. An apparatus for communicating configuration data between devices comprising:
a first receiver coupled to a first bi-directional communication channel and to a Display Data Channel, the first receiver for receiving data from the first bi-directional communication channel and from the Display Data Channel;
a first transmitter coupled to the first receiver and coupled to a second bi-directional communication channel, the first transmitter for transmitting data from the first receiver to the second bi-directional communication channel;
a second receiver coupled to the second bi-directional communication channel, the second receiver for receiving data from the second bi-directional communication channel;
a second transmitter coupled to the second receiver, to the first bi-directional communication channel and to the Display Data Channel, the second transmitter for transmitting data from the second receiver to the first bi-directional communication channel or to the Display Data Channel;
a first squelch module coupled to the first bi-directional communication channel, to the Display Data Channel and to the first transmitter, the first squelch module transmitting an enable control signal to the first transmitter responsive to receiving data from the first bi-directional communication channel or responsive to receiving data from the Display Data Channel, the enable control signal causing the first transmitter to transmit the received data to the second bi-directional configuration channel; and
a second squelch module coupled to the first squelch module, to the second bi-directional communication channel and to the second transmitter, the second squelch module receiving a disable control signal responsive to the first squelch module receiving data from the first bi-directional communication channel or receiving data from the Display Data Channel and transmitting the disable control signal to the second transmitter to prevent transmission of data from the second transmitter to the first bi-directional communication channel.

13. The apparatus of claim 12, wherein the first squelch module transmits a second disable control signal to the first transmitter responsive to determining an absence of data received from the first bi-directional communication channel or to determining an absence of data received from the Display Data Channel, the second disable control signal preventing the first transmitter from transmitting data from the first receiver to the second bi-directional configuration channel.

14. The apparatus of claim 12, further comprising:
a filter coupled to the first transmitter and to the second bi-directional communication channel, the filter receiving data from the first transmitter, filtering the data to generate filtered data and transmitting the filtered data to the second bi-directional configuration channel.

15. The apparatus of claim 14, wherein the filter comprises a T-section filter.

16. A method for communicating configuration data between devices, the method comprising:
receiving data, in a first squelch module, from a source device through a first bi-directional configuration channel;
determining, using a second squelch module, whether data is received from a sink device through a second bi-directional configuration channel; and
responsive to determining data is not received through the second bi-directional configuration channel, transmitting the data received from the source device to the second bi-directional configuration channel using a first transmitter coupled to the second bi-directional configuration channel and preventing data transmission to the source device through the first bi-directional configuration channel.

17. The method of claim 16, further comprising:
responsive to the first squelch module determining data is not received through the first bi-directional configuration channel, preventing data transmission to the sink device through the second bi-directional configuration channel.

18. The method of claim 16, wherein transmitting the data received from the source device to the second bi-directional configuration channel comprises:
generating modified data by modifying the data received from the source device; and
transmitting the modified data to the second bi-directional configuration channel.

19. The method of claim 18, wherein modifying the data received from the source devices comprises:
modifying a voltage associated with the data received from the source device.

20. The method of claim 16, wherein receiving data, in the first squelch module, from the source device through the first bi-directional configuration channel comprises:

receiving data having a first format from a first configuration channel or receiving data having a second format from a Display Data Channel.

21. An integrated device for communicating configuration data between devices, the integrated device including:

a combiner coupled to a first bi-directional configuration channel, to a Display Data Channel and to a second bi-directional configuration channel, the combiner including a first squelch module coupled to the first configuration channel and to the Display Data Channel and including a second squelch module coupled to the second bi-directional configuration channel, wherein:

responsive to the first squelch module receiving data from the first bi-directional configuration channel or from the Display Data Channel and the second squelch module not receiving data from the second bi-directional configuration channel, the combiner transmits data from the first bi-directional configuration channel or from the Display Data Channel to the second bi-directional configuration channel and the combiner prevents data transmission from the second bi-directional configuration channel to the first bi-directional configuration channel and to the Display Data Channel; and responsive to the second squelch module receiving data from the second bi-directional configuration channel and the first squelch module not receiving data from the first bi-directional configuration channel or from the Display Data Channel, the combiner transmits data from the second bi-directional configuration channel to the first bi-directional configuration channel or from the second bi-directional configuration channel to the Display Data Channel and the combiner prevents data transmission from the first bi-directional configuration channel and the Display Data Channel to the second bi-directional configuration channel; and a filter coupled to the combiner and to the second bi-directional communication channel, the filter receiving data from the combiner, filtering the data to generate filtered data and transmitting the filtered data to the second bi-directional configuration channel.

22. The integrated device of claim 21, wherein the first-configuration channel comprises a DisplayPort Active Channel.

23. The integrated device of claim 21, wherein the filter comprises a T-section filter.

24. The integrated device of claim 21, wherein the combiner and the filter receive power from a single power supply.

* * * * *